United States Patent [19]

Schlarmann

[11] 4,318,619
[45] Mar. 9, 1982

[54] METHOD OF AND APPARATUS FOR ASPHALTIC CONCRETE HOT MIX RECYCLING

[75] Inventor: Philip J. Schlarmann, Scotch Grove, Iowa

[73] Assignee: Iowa Manufacturing Company of Cedar Rapids, Iowa, Cedar Rapids, Iowa

[21] Appl. No.: 151,273

[22] Filed: May 19, 1980

Related U.S. Application Data

[60] Continuation of Ser. No. 10,982, Feb. 9, 1979, abandoned, which is a division of Ser. No. 831,154, Sep. 7, 1977, Pat. No. 4,165,184, which is a continuation-in-part of Ser. No. 808,991, Jun. 21, 1977, abandoned.

[51] Int. Cl.³ .................... B28C 5/06; B28C 5/20; B28C 5/46
[52] U.S. Cl. .................... 366/4; 366/7; 366/25
[58] Field of Search ............ 366/3–8, 366/10–15, 22–25, 40, 56, 57, 91, 105, 93–95, 144, 224, 228, 233; 106/273, 283

[56] References Cited

U.S. PATENT DOCUMENTS

| | | | |
|---|---|---|---|
| 3,832,201 | 8/1974 | Shearer | 106/281 |
| 3,999,743 | 12/1976 | Mendenhall | 366/4 |
| 4,025,057 | 5/1977 | Shearer . | |
| 4,075,710 | 2/1978 | Jakob et al. | 366/25 |
| 4,096,588 | 6/1978 | Mendenhall | 366/7 |
| 4,126,397 | 11/1978 | Mendenhall | 366/7 |

FOREIGN PATENT DOCUMENTS 35737 7/1923 Denmark .

OTHER PUBLICATIONS

Hot Mix Recycling of Asphalt Pavements, by Charles R. Foster, (7-1975), National Asphalt Pavement Association (NAPA).
State of the Art, Hot Mix Recycling, 4-1977, written and published by NAPA.
Recycling Report, 9-1977, by NAPA.

*Primary Examiner*—Robert W. Jenkins
*Assistant Examiner*—Timothy F. Simone
*Attorney, Agent, or Firm*—Haven E. Simmons; James C. Nemmers

[57] ABSTRACT

A method of hot mix recycling of old asphaltic concrete paving heats the old pavement, after it has been removed and sized, to a temperature below its firing point and heats fresh aggregate to a greater temperature before combining the two and adding new asphalt. The method is embodied in a drum-mixer type of apparatus modified by inserting a smaller drum in the upstream portion of the large drum. The burner fires into the smaller drum into which the fresh aggregate only is introduced while the old mix (plus additional fresh aggregate in certain cases) is introduced into the annular space between the two drums, the fresh aggregate and the old mix being thereafter combined in the large drum, new asphalt added and the mix further heated.

8 Claims, 4 Drawing Figures

METHOD OF AND APPARATUS FOR ASPHALTIC CONCRETE HOT MIX RECYCLING

CROSS REFERENCE TO RELATED APPLICATIONS

This application is a continuation of application Ser. No. 010,982, filed Feb. 9, 1979, abandoned, which was a division of application Ser. No. 831,154, filed Sept. 7, 1977, now U.S. Pat. No. 4,165,184, which was a continuation-in-part of application Ser. No. 808,991, filed June 21, 1977 abandoned.

BACKGROUND OF THE INVENTION

The notion and practice of reusing or "recycling" old asphaltic concrete paving is not novel. Both have been known and employed for many decades, since, indeed, the early days of bituminous paving. But as the use of bituminous paving grew and the cost of asphalt correspondingly declined, the need for and thus the use of recycling all but disappeared. Now, however, the abrupt and rapid increases in the price of crude oil and other energy in the past few years has revived asphalt paving recycling as an economically feasible and desirable practice. Currently, there are basically three approaches.

"Surface Recycling" is one of several methods in which the surface of existing asphalt paving is planed, milled or heated in place and scarified. The material removed is then remixed, relaid and rolled. Additional new hot asphalt, softening agents, aggregates or combinations of these may be added during the remixing stage. The end product when relaid may form the final surface or may be overlaid with fresh asphalt.

"Cold-Mix Recycling" is another of several methods in which the entire pavement structure, including sometimes untreated base material, is reprocessed in place or removed and processed elsewhere. The ingredients are mixed cold and may be reused as an aggregate base material. Asphalt or other materials or both can also be added during the processing to increase the strength of the material as an aggregate base. In any event, a final surface of fresh asphalt is necessary.

"Hot-Mix Recycling" is still another of a number of methods where the major portion of the existing pavement structure, sometimes including the underlying untreated base material, is removed, sized and mixed hot with fresh asphalt at a central plant. New aggregate or a softening agent or both may be added at the same time. The end product is much more versatile and can be laid hot as an asphalt base, binder or final surface.

In the hot-mix technique, with which the present invention is concerned, the old or "aged" asphaltic concrete pavement or mix is first broken up, hauled away and then appropriately sized in a crushing-screening plant. No matter what particular method of hot-mix recycling is used, the sized, aged mix must be heated in some manner in order to reactivate the old asphalt and restore its plasticity and workability. But if its temperature is raised too far two things happen. The essential characteristics of the old asphalt are impaired or destroyed by firing or coking and large quantities of smoke are generated, resulting in plant emissions prohibited by current and increasing environmental pollution control standards.

Bearing upon the temperature and smoke problems is the nature of the plant in which recycling is achieved. In the "conventional" type plant, aggregate is first heated in a dryer and then combined with asphalt in a mixer, such as a "pugmill". When such a plant is adapted for recycling, new aggregate is heated to, say, 450°–600° F. in the dryer and then combined in the mixer with the aged asphalt at stockpile temperature. The latter is heated by heat transfer from the hot fresh aggregate, whereupon fresh asphalt or softening agents or both are added. The addition of virgin aggregate may be necessary to correct "gradation" problems, i.e., too many or too few fines, in the aged mix. Virgin aggregate may be also necessary because if merely fresh asphalt is added there may then be too much asphalt and the resulting mix is too "fat" or "rich", impairing its stability besides wasting asphalt. The same is true if just softening agents are added. For instance, if the aged mix is brittle owing to low residual asphalt penetration, then a greater amount of new high penetration asphalt plus some virgin aggregate are needed to obtain a final mix or proper asphalt penetration having a quality which meets current road building standards and specifications. If, on the other hand, the old asphalt is of good, usable penetration quality, but the old aggregate gradation is improper, e.g., too many or too few fines, then virgin aggregate and again proper penetration asphalt are necessary to provide a recycled mix of proper quality. Between these extremes there can, of course, be cases in which either virgin aggregate or fresh asphalt may not be required at all. In any event, though the foregoing technique avoids the firing and smoke problems, relying on the heat of the fresh aggregate only to heat the aged mix has several drawbacks. In the first place, the amount of aged mix which can be used is limited if it is to be heated sufficiently. Next, heat is wasted since it is used only to heat the fresh aggregate and thereafter is disposed of without further use. If, on the other hand, the aged mix is directly heated by being sent through the dryer together with the fresh aggregate, firing and smoke problems emerge unless burner heat is reduced or its flame shortened, extra cooling air is introduced or other expedients are used, all of which result in plant production only about 50% of normal.

In the drum-mix type of plant, in effect, the dryer itself is used both to dry the aggregate and to mix in the asphalt. The burner at one end dries and heats the aggregate which cascades through the drum while the asphalt is introduced into the aggregate at a point sufficiently remote from the burner to prevent firing and smoke. The resulting mixture is discharged from the drum ready for use. An example of a drum-mixer of this type is found in U.S. Pat. No. 3,423,422. When a drum-mixer is used for recycling, however, firing and smoke problems also occur unless steps are taken to keep down the temperature of the aged mix which is introduced into the drum, usually together with fresh aggregate. Particularly, it is vital to avoid direct contact between the burner flame and its hot combustion gases on the one hand and the aged mix on the other, especially its fines which readily incinerate. Here, too, sometimes the burner is moved back or its flame shortened or flame barriers are added in order to try to prevent the asphalt in the aged mix from igniting. Extra cooling air or even water may be introduced or the fines of the aged mix admitted further down the drum, as for example, in U.S. Pat. No. 3,999,743. All of these approaches help but do not eliminate the firing and smoke problems, at least not without impairing the final mix or the efficiency and output of the plant.

Another approach has been to build special types of drum-mixers. An example is shown in U.S. Pat. Nos. 3,845,941 and 4,000,000, in which the interior of the drum is fitted with a large number of spaced tubes running end to end through which the heat of the burner is directed, the aged mix being heated by contact with the exterior of the tubes as it tumbles through the drum. This avoids the firing and smoke problems, it is true, since the temperature of the aged mix is kept down by not being directly exposed to the burner flame. But, besides requiring a special and not inexpensive piece of equipment, the heat transfer to the aged mix is not satisfactory, at least from the standpoint of fuel consumption, and the interior of the drum easily becomes plugged between the closely spaced tubes by the aged mix. In short, despite a number of years of effort, so far as is known, no really satisfactory method or apparatus for hot mix recycling of old asphalt pavement has hitherto emerged.

Accordingly, the primary object of the present invention is to provide a method and apparatus for hot-mix recycling of old asphaltic concrete pavement which avoid the problems outlined above and, as embodied in a drum-mixer type of plant, requires but a minimum of modification and addition to the plant, both of which are relatively inexpensive and permit the plant to be readily shifted back and forth between normal and recycling operation.

SUMMARY OF THE INVENTION

Essentially, the present invention recognizes that, since the aged mix, especially its fines, must not be heated to as high a temperature as is needed for the fresh or virgin aggregate before the two can be combined, each should therefore be treated separately in this respect. The aged mix is heated as far as possible to a uniform temperature in the range of 100° to 250° F. to begin restoration or rejuvenation of its plasticity, but well below its firing point, and the fines particularly kept from any direct flame impingement. The fresh aggregate, on the other hand, is heated to about 300°–600° F., depending upon the ratio of the quantities of aged mix and fresh aggregate and the total amount of both, i.e., the rate of production of the recycled mix, so that when the two are mixed the final temperature of the whole will be in the 175° to 275° F. range, low enough to avoid firing and smoke problems, and such that its temperature can thereafter even be increased without the risk of those problems. Finally, after the two have been combined, the new asphalt is added and mixed in to produce the recycled material ready for use. This basically is the method aspect of the invention.

A preferred apparatus for practicing the method employs a conventional drum-mixer modified essentially in the following manner: The burner at one end is moved back and a smaller sleeve or drum is inserted between it and the main drum of the mixer, the burner discharging into the outer or upstream end of the smaller or inner drum which extends coaxially into the main or outer drum for about one-quarter to one-half of the length of the latter and rotates with it. The virgin aggregate is introduced into the upstream end of the inner drum and is thus in direct contact with the flame of the burner. The aged mix, however, is introduced into the outer drum in the annular space between it and the inner drum. The aged mix is therefore shielded from direct contact by the flame but is heated owing to its tumbling against the hot exterior of the inner drum as the latter and the outer drum rotate. The hot virgin aggregate spills from the downstream end of the inner drum and joins the heated aged mix. Thereafter the two are thoroughly mixed as they travel through the remainder of the outer drum during which travel the fresh asphalt is added. In fact, as the combined mix progresses from the downstream end of the inner drum through the remainder of the outer drum it is additionally heated by the hot gases existing from the inner drum. Hence the temperature of the recycled material discharged from the downstream end of the outer drum ready for use is greater than its temperature at the downstream end of the inner drum.

The initial heating of the aged mix in the foregoing manner assures that its temperature is never high enough to cause firing of the old asphalt or smoke problems at a time when the aged mix and particularly its fines are especially vulnerable in this respect. Then when the aged mix is combined with the hotter fresh aggregate, the resulting temperature of the two is still below that at which problems begin. Thereafter, as the two continue through the remainder of the drum, additional heat is added directly to the mixture by the hot combustion gases to insure thorough and uniform heating of the aged mix at a time when it, especially its fines, is not longer so susceptible to firing. Since the burner heats the fresh aggregate by direct flame and hot gas impingement, as when used in the conventional manner, and direct impingement of the combustion gases downstream of the inner drum maintains and increases the temperature of the combined fresh aggregate and aged mix, also as when used in the conventional manner, there is thus no loss of burner efficiency, wasted heat or any consequent increase in fuel consumption for a given output. Plant output is therefore high when recycling. Currently that output is in the 75% range compared to conventional operation but even higher percentages are expected as experience is acquired. Finally, the modification for recycling purposes is both simple and relatively inexpensive so that the conventional plant can be relatively easily switched from one mode to the other without need of costly additional apparatus or an entirely different plant for recycling only. In fact, the plant when set-up for recycling according to the invention can also be used in the conventional manner without need to re-convert it by removing the inner drum. In short, the apparatus is as versatile as it is effective and efficient.

Other features and advantages of the present invention will become apparent from the drawings and the more detailed description which follows.

DETAILED DESCRIPTION OF THE PREFERRED EMBODIMENT

Figure 1:
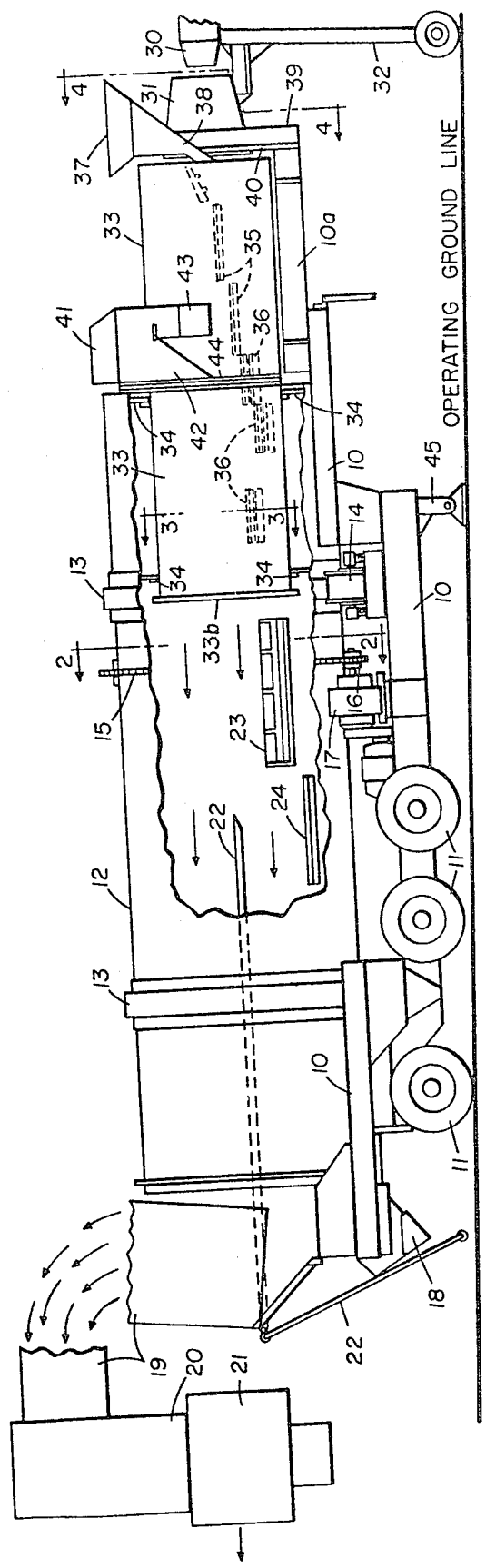
FIG. 1 is a side elevation of a typical drum-mixer type of asphalt plant modified to incorporate the present invention.
Figure 2:
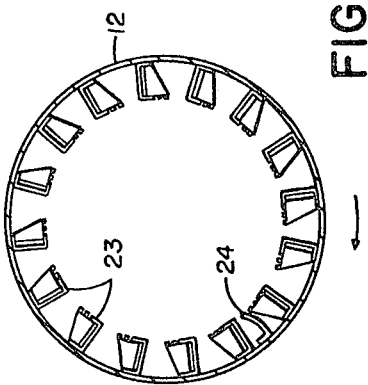
FIG. 2 is a sectional view along the line 2—2 of FIG. 1 showing the arrangement of part of the flighting within the outer drum.

Essentially, the drum-mixer is carried on an elongated frame 10 equipped with rubber tired wheels 11 for ground transport. The larger or outer drum 12 is supported on the frame 10 for rotation about its axis by circumferential iron "tires" 13 which ride on flanged rollers 14, one of which is shown mounted on the frame 10. Rotation of the drum 12 is accomplished by a large sprocket 15 thereabout driven by a chain and sprocket 16 and motor 17. The downstream end of the drum 12 is fitted with a discharge gate 18 for the recycled mix. Combustion products are drawn through ducting 19 and a suitable dust collector 20 by a large exhaust fan 21 before being expelled to the atmosphere. A pipe 22 for introduction of fresh asphalt extends axially part way into the drum 12 from its downstream end, the end of the pipe 22 being beveled at its discharge end as shown in FIG. 1. The interior of the drum 12 is fitted with 6 "rings" of flighting, the "rings" being spaced from each other axially of the drum 12 and alternately offset from each other. The first two "rings" of flighting are of the "grid" type 23, the entire second such "ring" being shown in FIG. 2 and one of the "grids" 23 in FIG. 1. The remaining four "rings" are of the "blade" type 24, one of those of the third "ring" being shown in FIGS. 1 and 2. The number of "rings" and the number of flighting in each will vary, of course, with the size of the plant, the above having been found suitable in the case of a drum 12 or 32 foot length and 110 inch diameter. All of the foregoing is substantially conventional and no further description of it is necessary.

Figure 3:
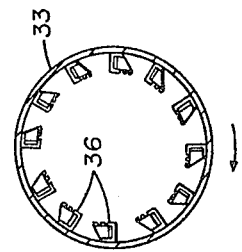
FIG. 3 is a sectional view along the line 3—3 of FIG. 1 showing the arrangement of part of the flighting within the inner drum.
Figure 4:
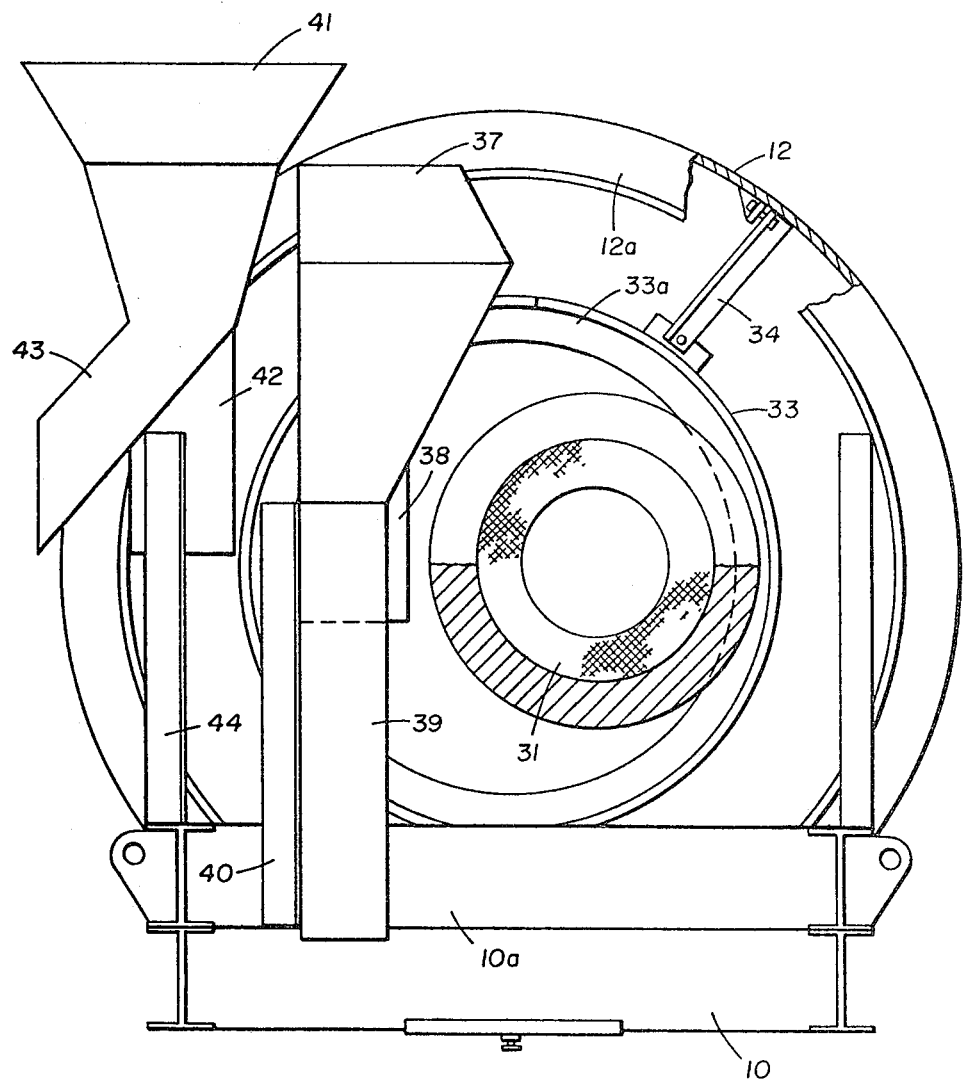
FIG. 4 is a view taken from the line 4—4 of FIG. 1 and illustrating the arrangement for introducing the aged mix and the fresh aggregate into their respective drums.

The upstream end of the outer drum 12, however, which is fitted with an inner annular flange 12a, is altered in several respects. The burner 30 and its refractory lined port 31, normally supported on the upstream end of the frame 10, are removed and remounted, either upon a separate wheeled stand indicated at 32 or upon a suitable extension of the frame 10. Then a smaller, inner drum 33 is mounted coaxially with the outer drum 12 by means of radial brackets 34, one of which is shown in some detail in FIG. 4, the drum 33 extending from the burner port 31 about one-quarter to one-half of the way into the upstream end of the outer drum 12. The upstream end of the inner drum 33 is also fitted with an inner annular flange 33a, and in order to vary the intrusion of the drum 33 into the drum 12, its downstream end is provided with an outer annular flange 33b so that an additional inner section can be added or removed. The interior of the drum 33 is also fitted with five alternately offset "rings" of flighting, the first two of which are of the "blade" type, one member of each such "ring" being indicated in broken lines at 35 in FIG. 1. The remaining three "rings" are again of the "grid" type, one member of each such "ring" also being shown in broken lines at 36 in FIG. 1 and a full "ring" in FIG. 3. Here again the number of "rings" and the number of flighting will vary with the size of the plant concerned, the foregoing having been found suitable for a drum 12 of the previously mentioned size and an inner drum 33 of 16 foot length and 64 inch diameter extending 8 feet into the drum 12. The burner 30 and port 31, as shown in FIG. 4, are laterally offset relative to the drum 33 to provide space for a hopper 37 and alternate chutes 38 and 39, supported on bracket 40 from the frame extension 10a, for receiving fresh aggregate from a conveyor (not shown). Likewise, a hopper 41 having alternate chutes 42 and 43 for receiving the sized aged mix from a conveyor (not shown) is also supported upon a bracket 44 from the frame extension 10a. The two conveyors may be coordinated by any suitable automatic system in order to insure proper proportioning of the aged mix and the fresh aggregate. The chute 38 introduces the fresh aggregate into the upstream end of the inner drum 33 while the chute 42 introduces the aged mix into the annular space between the drums 12 and 33. The alternate chutes 39 and 43 divert their respective materials for checking the accuracy of the plant's belt weighing system.

When the plant is operated for recycling, as when it is for normal operation, the upstream end of the frame 10 is elevated by lifting jacks 45 so that the axis of the drums 12 and 33 is slightly downwardly inclined as shown in FIG. 1, the angle of inclination depending upon the desired rate of production. The drums 12 and 33 are rotated by the motor 17 and secondary air for the burner 30 is drawn in the upstream end of the drum 33 by the fan 21 which in turn draws the combustion products and dust through the filter 20 before discharging them to the atmosphere. The fresh aggregate from one conveyor is introduced through the hopper 37 and chut 38 into the upstream end of the inner drum 33, and is heated to 300°–600° F., depending upon the quantity involved, by direct impingement of the flame and hot gases from the burner 30 as the aggregate is cascaded through the drum 33 by the flighting 35 and 36. If larger quantities of fresh aggregate are used so that more prolonged heating of it is necessary an extension to the inner drum 33 can be bolted to the flange 33b. Meanwhile, the aged mix from the other conveyor enters through the hopper 41 and chute 42 into the annulus between the drums 12 and 33 and is heated only indirectly to 100°–250° F., again depending upon the quantity involved, by being cascaded over the hot wall of the drum 33 by the effects of the flighting 23. The ratios of the quantities of the fresh aggregate and the aged mix, present experience indicates, may be from about 50-50 down to about 20-80, respectively. If desirable, the exterior of the drum 33 within the drum 12 may be provided with mixing blades, dams, fins or the like to retard flow of the aged mix in order to increase transfer of heat to it. At any rate, the resulting temperature of the aged mix should be high enough at least to begin the reactivation or rejuvenation of the old asphalt to restore its plasticity and workability. Thereafter, the hot fresh aggregate, at 300°–600° F., spills from the downstream end of the drum 33 and mixes with the larger quantity of heated aged mix at 100°–250° F. The two settle at a combined temperature of 175°–275° F. as they proceed down the drum 12, the fresh asphalt being introduced from the pipe 22, the discharge end of the latter in the case of a plant of the dimensions previously given being about 8 to 10 feet downstream of the inner end of the drum 33. From then on especially, the risk of incinerating the fines has passed and the combined mix continues through the drum 12, its temperature being increased somewhat by direct impingement of the hot combustion gases exiting from the inner drum 33, until it is discharged as recycled mix through the gate 18 at a temperature of 180°–350° F., ready for use.

In short, the indirect heating of the aged mix keeps its temperature and particularly that of its fines before mixing with the fresh aggregate well below the firing or coking point, which is referred to in the appended claims as the "destructive temperature" of the old asphalt in the aged mix, and hence smoke and pollution problems are eliminated. At the same time, efficiency in terms of both fuel consumption and plant output is maintained, the stack temperature of the gases in the ducting 19, etc., being as low as the temperature of the recycled mix when discharged through the gate 18, and indicating maximum use of the heat of the burner 30 which leaves the downstream end of the inner drum 33 in the 700° F. range. When high plant output is needed and the inner drum 33 alone cannot handle all the required fresh aggregate, some of the latter can be introduced together with the aged mix into the annular space between the drums 12 and 33. For normal operation of the plant the inner drum 33 can be removed and the burner 30 and port 31 moved forward to the frame extension 10a. Or the plant can simply be operated conventionally with the drum 33 in place, the fresh aggregate being introduced into both drums 12 and 33 if necessary to obtain sufficient output.

The foregoing temperature and quantity ranges have been based upon past experience in the dryer, drum-mixer and recycling art generally as well as upon calculations involving material quantities and ratios, moisture content, desired temperature levels, overall production rates and the like. In addition, they also reflect results obtained with a laboratory pilot model of the foregoing apparatus and actual experience at a paving site at which a recycled mix was prepared according to the invention in a plant of the dimensions previously given, which mix was thereupon successfully laid as new pavement. For instance, the ratio of the quantity of fresh aggregate to that of aged mix will affect the temperature of each. That is to say, as an example, the more aged mix there is relative to fresh aggregate, the higher up the temperature of the latter will be in the 300°–600° F. range and the lower down the temperature of the former will be in the 100°–250° F. range. Likewise, the temperatures at the various locations in the two drums will also be affected by the moisture content, the specific heat and the gradation of the materials employed from time to time.

Various modifications and adaptations of the invention are possible. For instance, the drums 12 and 33 could be arranged so that the flame and fresh aggregate are introduced into the annular space between them and the aged mix into the inner drum 33. Or, in either case, the combined mix could be discharged from the drum 12 into a typical "batcher" type plant and the fresh asphalt added there instead of downstream of the drum 33. Further, the two drums could be apart from each other, the burner heat and fresh aggregate being introduced into one and then being fed by conveyor or gravity into the other into which the aged mix and fresh asphalt are also introduced, the heat from the first drum being ducted into the second.

In any event, therefore, though the method and apparatus aspects of the present invention have been described in terms of a particular embodiment, being the best mode known of carrying out the same, they are not limited to that embodiment alone. Instead, the following claims are to be read as encompassing all adaptations and modifications of the invention falling within its spirit and scope.

I claim:

1. In the hot mix method of recycling aged asphaltic concrete pavement which has been removed and sized to provide an aged mix including old asphalt and aggregate, the improvement comprising: providing a stream of hot gases moving in a downstream direction from a source, the hot gas stream at an upstream location having a first temperature greater than the destructive temperature of the old asphalt; introducing a quantity of fresh aggregate into the hot gas stream at said location and heating the fresh aggregate to the first temperature by cascading the same across the hot gas stream while moving the fresh aggregate in said direction; employing a portion of the heat of the hot gas stream to separately heat a quantity of aged mix while moving the same in said direction but apart from the heated fresh aggregate to a second temperature less than the destructive temperature of the old asphalt but sufficient to at least begin restoration of its plasticity; combining and mixing the two heated quantities of the fresh aggregate and the aged mix by introducing the heated aged mix into the stream of hot gases and the heated fresh aggregate at a location downstream of said upstream location to produce a heated quantity of combined mix having a third temperature less than the destructive temperature of the old asphalt; and cascading the combined mix across the hot gas stream while continuing to move the same in said direction and adding a quantity of fresh asphalt thereto to produce a recycled mix, the recycled mix being heated by the hot gas stream to a fourth temperature greater than the third temperature but less than the destructive temperature of the old and the new asphalt.

2. The method of claim 1 wherein the first temperature is about 300° to 600° F., the second temperature is about 100° to 250° F., the third temperature is about 175° to 275° F., and the fourth temperature is about 180° to 350° F.

3. The method of claim 2 wherein the ratios of the quantities by weight of the fresh aggregate to the aged mix is from about 50/50 to about 20/80.

4. The method of claim 1, 2 or 3 wherein the fresh aggregate is heated as aforesaid in a first chamber, and the aged mix is heated as aforesaid in a second chamber.

5. The method of claim 4 wherein said source includes burner means, the burner means and the first and second chambers being disposed with respect to each other effective so that the fresh aggregate in the first chamber is directly heated by the hot gas stream and the aged mix in the second chamber is indirectly heated by the hot gas stream.

6. The method of claim 5 wherein the first and second chambers are separated by a common wall, the hot gas stream of the burner means directly heating one face of said common wall and the fresh aggregate in the first chamber, the aged mix in the second chamber being indirectly heated by contact with the other face of said common wall.

7. The method of claim 6 wherein the heated fresh aggregate and the aged mix are combined in a third chamber to produce the combined mix, the combined mix being further heated and the fresh asphalt added thereto in the third chamber.

8. The method of claim 7 wherein the third chamber comprises a continuation of one of the first and second chambers.

* * * * *